3,283,202
GAS DISCHARGE SPECTRAL LAMP OF
5350 ANGSTROMS
Keith S. Pennington, Murray Hill, N.J., assignor to Bell Telephone Laboratories, Incorporated, New York, N.Y., a corporation of New York
Filed Apr. 4, 1963, Ser. No. 270,757
1 Claim. (Cl. 315—46)

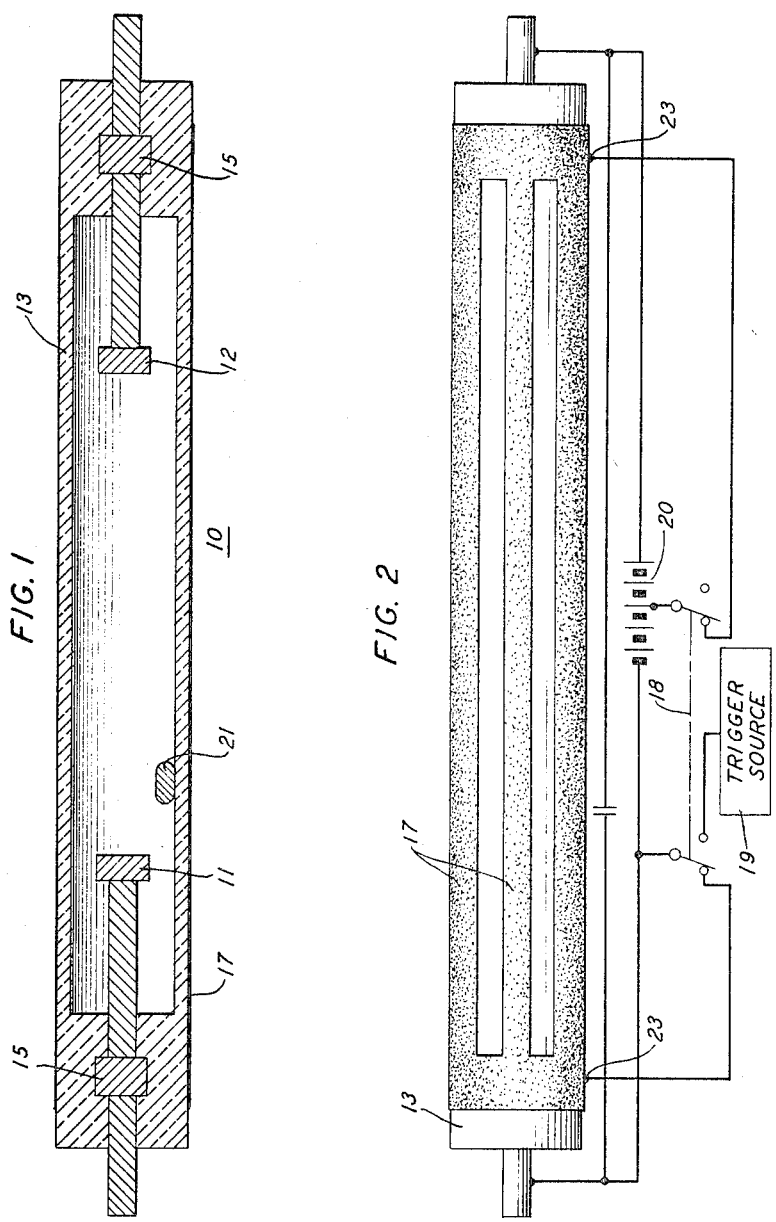

This invention relates to gas discharge devices. The invention has particular application to gas discharge devices that are used as flash lamps for pumping lasers.

The laser is a relatively recent invention of far-reaching technological importance because of its ability to amplify light waves and to produce coherent light frequency oscillations. As is known, in one of the more promising forms, the lasing action which produces amplification or oscillation is initiated by a burst of light which includes energy at a particular frequency known as the pump frequency. For the well-known ruby laser, one of the convenient pump frequency bands lies within the range of 5200 to 5500 angstroms per wavelength. Light energy within this particular range is typically produced by triggering a gas discharge through an atmosphere of xenon. It has been estimated, however, that only about ten to fifteen percent of the visible light radiated by the xenon atoms during discharge lies within the pumping band of ruby. In addition to the resultant inefficient conversion of the energy supplied to the lamp, the presence of light outside the useful pumping band typically tends to cause extraneous heating of the laser material or other undesirable effects.

It is therefore a specific object of this invention to increase the quantity of light within the pumping band of ruby lasers obtainable from a flash lamp under practical conditions.

It is a broader object of this invention to increase the efficiency of gas discharge flash lamps operating at a wavelength of about 5350 angstroms.

These and other objects of my invention are attained in an illustrative embodiment thereof comprising a flash lamp having a cathode and an anode surrounded by a transparent envelope. The envelope contains an inert gas, while a relatively high voltage is maintained between the cathode and the anode. A trigger electrode, which can be switched to make connection with a source of voltage pulses, extends along the length of the device. When a voltage pulse is transmitted along the trigger electrode, a gas discharge is initiated in a well-known manner between the cathode and anode.

It is a feature of this invention that the flash lamp contain a quantity of vaporized thallous mercuric chloride. The gas discharge breaks the vaporized compound down into its component elements; viz., thalium, mercury, and chlorine, and excites some of the thallium atoms to the $7^2S_{1/2}$ excited energy state. As many of the excited thallium atoms decay to a lower energy level, they emit radiation at 5350 angstroms. It is characteristic of the gas discharge that an appreciable fraction of the total light emitted is of this wavelength.

Thallous mercuric chloride is a particularly good source of thallium because it vaporizes at a relatively low temperature and has a relatively high vapor pressure. A high density of thallium in the discharge region can thereby be attained by heating the flash lamp to temperatures as low as 200 to 240 degrees centigrade. Since the melting point of pure thallium is 1457 degrees centigrate, its use would be impractical. Other thallium compounds vaporize at lower temperatures but non are as low as thallous mercuric chloride; further, none have been found which have vapor pressures as high as thallous mercuric chloride under as conveniently realizable temperature conditions.

Moreover, thallous mercuric chloride releases mercury which inherently enhances the radiation of thallium atoms at 5350 angstroms. As will be explained later, when metastable mercury atoms collide with thallium atoms, the thallium atoms are excited to the $7^2S_{1/2}$ state, which is required for the desired radiation. This phenomenon can be further increased by introducing free mercury into the tube envelope.

It is a further feature of this invention that the inert gas in the flash lamp be argon. As will be explained hereafter, argon increases the number of metastable mercury atoms which are responsible for increased radiation of the thallium atoms at 5350 angstroms.

It is a subsidiary feature of this invention that the trigger electrode comprise a plurality of transparent strips of tin oxide film which are coated on the tube envelope. Besides the trigger pulse source, a steady voltage source can be connected to the film. When the steady current is transmitted through the film, the device is heated to 300 to 400 degrees centigrade, which vaporizes the thallous mercuric chloride. The connection to the tin oxide strips is then switched from the steady source to the trigger pulse source to initiate the discharge. Tin oxide film works particularly well for my flash tube because it can act as both a heater and trigger electrode and because it is transparent.

These and other objects and features will be better appreciated from a consideration of the following detailed description, taken in conjunction with the accompanying drawing in which:

FIG. 1 is a sectional view of one embodiment of the invention; and

FIG. 2 is a side view of the device of FIG. 1.

Referring now to FIG. 1, there is shown a flash lamp 10 comprising a cathode 11 and an anode 12, which are maintained within a controlled atmosphere by a tubular envelope 13 which is of a transparent heat resistant material such as quartz. The cathode and anode lead-in wires are vacuum sealed to the envelope by molybdenum ribbon seals 15, which are shown only for purposes of illustration. The envelope also contains a quantity of argon, the purpose of which will be explained hereafter.

The gas discharge and resultant light flash is initiated in a known manner by a trigger voltage pulse which initially ionizes some of the gas molecules. The trigger pulse is transmitted by a plurality of tin oxide strips 17 on the outer surface of the envelope, as is best seen in FIG. 2. The lamp is flashed by momentarily switching a ganged switch 18 to the down position to contact a trigger source 19. Source 19 releases an electrical pulse which has, for example, a voltage on the order of ten to fifteen kilovolts and a duration on the order of fifty microseconds. The construction of the trigger source 19 and switch 18 may take a number of specific forms which are known to workers in the art. The tin oxide coating is thin enough to be substantially transparent, which permits efficient utilization of the light flash.

In accordance with the invention, a mass 21 of thallous mercuric chloride is contained within the envelope to maximize the portion of emitted light which is within the desired pumping band. Before discharge, the device is heated to a temperature sufficient to vaporize the pellet 21, that is, to a temperature above 200 degrees centigrade. This is done by positioning switch 18 to contact a steady voltage source 20 which transmits current through the strips 17. The resistance of thin tin oxide films is appropriate for producing temperatures by resistance heating that are high enough to vaporize thallous mercuric chloride. If, for example, flash lamp 10 is six inches long, the resistance across the oxide strips 1000 ohms, and the steady voltage between terminals 23 approximately 500 volts, the device will be quickly heated to the order of 300–500 degrees centigrade. During fabrication, it is convenient to evaporate the tin oxide onto the envelope, and to periodically monitor the direct-current resistance between the terminals until the desired resistance is obtained. The mass of thallous mercuric chloride should normally be such that when heated as described saturation of the envelope with thallous mercuric chloride vapor results. For the example described, this is accomplished by a mass of fifty milligrams. After heating, the gas discharge is triggered as explained above.

I have found that a gas discharge through the atmosphere described above produces a surge of green light at 5350 angstroms which can be very useful and efficient for pumping lasers that are responsive to pumping light at this wavelength. In order to appreciate why a high proportion of the total light is emitted at this particularly frequency, a brief examination of the mechanism of the gas discharge is perhaps advisable. Ionization of the atmosphere by the trigger pulse and subsequent gas discharge breaks the vaporized thallous mercuric chloride down to its constituent elements—thallium, mercury, and chlorine. During this process, some of the thallium atoms are excited to the $7^2S_{1/2}$ energy state. When these electrons decay to the $6^2P_{3/2}$ state, they emit light at 5350 angstroms; see, for example, "Resonance Radiation and Excited Atoms," Mitchell and Zemanski, Cambridge University Press, 1961, page 17.

This radiation is enhanced by the presence of a certain number of mercury atoms in the excited $6^3P_0$ metastable energy state. It can be shown that when these metastable mercury atoms collide with an unexcited thallium atom, the mercury atom is de-excited while the thallium atom is excited to the $7^2S_{1/2}$ state; this is the energy state required for generating green light as described above.

Radiation at 5350 angstroms is further enhanced by using argon as the inert gas medium. The initial electric discharge produces many excited mercury atoms at the $6^3P_1$ and $6^3P_2$ energy states. It can be shown that when an argon atom collides with mercury atoms in either of these states, the mercury atoms decay to the $6^3P_0$ metastable state which is required for enhancing radiation of green light as described above. Other gases such as nitrogen or xenon could alternatively be used instead of argon, but these other gases would not serve to increase the number of metastable mercury atoms.

Theoretically, the radiation described above could be achieved by introducing free mercury and free thallium into the tube envelope and vaporizing them. This would not be particularly practical, however, because the melting point of thallium is 1453° C. The boiling point of thallous mercuric chloride, on the other hand, is between 200 and 240° C. which is easily attainable by directing currents through the tin oxide strips as described above. Further, the vapor pressure of thallous mercuric chloride is much higher than that of thallium or of various other thallium compounds. The process of vaporizing thallous mercuric chloride and breaking it down to its constituent elements by the gas discharge therefore produces a high density of thallium for producing a relatively high quantity of radiation at 5350 angstroms.

Another advantage of thallous mercuric chloride is the fact that substantially one hundred percent of the constituent elements readily recombine to reform the compound after the discharge is terminated. On the other hand, thallium iodide, as one example, fails to recombine completely after it has been broken down by a gas discharge; the quantity of usable thallium therefore decreases substantially with each subsequent flash of the lamp. Thallous mercuric chloride is also an appropriate choice because it inherently constitutes a source of mercury.

The enhancing effect of mercury may, if desired, be maximized by adding free mercury, in controlled amounts, to the tubular envelope in addition to the thallous mercuric chloride. For example, when the tube is heated to 300–400 degrees centigrade, the density of mercury resulting from the vaporization of thallous mercuric chloride corresponds to a pressure of about one centimeter of mercury. I have found that the radiation of green light at 5350 angstroms is further increased at this temperature as free mercury is added to the device up to the limiting pressure of approximately two centimeters of mercury.

With the temperature at 300–400 degrees centigrade and a voltage between the cathode and anode of one to three kilovolts, an argon pressure of 0.7–2.0 centimeters of mercury is satisfactory for obtaining a gas discharge and for enhancing green light radiation. Under these conditions, tin oxide film makes a particularly advantageous triggering electrode and heating element because it can perform both of these functions and is still thin enough to be transparent to the light flash. However, conventional trigger electrodes and heating elements could alternatively be used.

It is also to be understood that the various voltages, temperatures, and pressures are given only for purpose of illustration. For example, a temperature as low as 200° C. may be used if it is desirable to operate at lower thallous mercuric chloride pressures. The use of either argon or free mercury in the tube envelope is not essential for a useful radiation of green light at 5350 angstroms, but these elements do further enhance this radiation as explained above. Further, continuous gas discharge devices (C.W. tubes), as well as flash lamps, can employ the inventive concept for increasing the quantity of emitted green light; in fact, the invention may be used in any application where a light source providing light having a wavelength of about 5350 angstroms is useful. Various other embodiments and modifications may be made by those skilled in the art without departing from the spirit and scope of the invention.

What is claimed is:

A flash lamp for efficiently radiating light at a wavelength of about 5350 angstroms comprising:
- a substantially transparent envelope containing a quantity of argon;
- a cathode and an anode within the envelope;
- a quantity of thallous mercuric chloride within the envelope;
- a plurality of substantially transparent strips of conductive film coated on the envelope;
- means for passing a direct current through the film, whereby the envelope is heated to a temperature sufficient to vaporize the thallous mercuric chloride;
- and means for passing a current pulse through the film of sufficient intensity to trigger a gas discharge between the cathode and anode.

References Cited by the Examiner

UNITED STATES PATENTS

| | | | |
|---|---|---|---|
| 1,088,740 | 3/1914 | Steinmetz | 313—229 X |
| 2,203,550 | 6/1940 | Spanner | 315—49 |
| 2,240,353 | 4/1941 | Schnetzler | 313—229 X |
| 2,497,507 | 2/1950 | McMasters | 219—522 |
| 2,512,280 | 6/1950 | Lemmers | 315—46 X |
| 2,765,416 | 10/1956 | Bease et al. | 313—223 X |
| 2,977,450 | 3/1961 | Boicey | 219—543 |
| 3,093,769 | 6/1963 | Kuhl et al. | 315—46 |
| 3,234,421 | 2/1966 | Reiling | 313—25 |

JAMES W. LAWRENCE, *Primary Examiner.*

DAVID J. GALVIN, *Examiner.*

C. R. CAMPBELL, *Assistant Examiner.*